United States Patent Office 3,470,225
Patented Sept. 30, 1969

3,470,225
PROCESS FOR THE PRODUCTION OF ORGANIC SILICON COMPOUNDS
Helmut Knorre, Hainstadt am Main, and Wilfried Rothe, Strotzbach Post Mombris, Germany, assignors to Deutsche Gold- und Silber-Scheideanstalt vormals Roessler, Frankfurt am Main, Germany
No Drawing. Filed Dec. 18, 1967, Ser. No. 691,247
Claims priority, application Germany, Dec. 16, 1966, D 51,794
Int. Cl. C07f 7/02
U.S. Cl. 260—448.2         4 Claims

ABSTRACT OF THE DISCLOSURE

Production of organic silicon compounds by addition of silicon compounds containing at least one hydrogen atom bound directly to silicon on organic compounds containing at least one non-aromatic double or triple C—C bond using a coordinate complex of the empirical formula $PtX_2(RCOCR'COR'')_2$ wherein X is halogen, R is alkyl, preferably, lower alkyl, R' is hydrogen or alkyl, preferably lower alkyl, and R'' is alkyl or alkoxy, preferably lower alkyl or alkoxy.

BACKGROUND OF THE INVENTION

The invention relates to the production of organic silicon compounds containing at least one hydrogen atom bonded directly to silicon on organic compounds containing at least one non-aromatic double or triple C—C bond in the presence of a platinum catalyst.

It is known that this addition reaction which normally proceeds very slowly and with poor yields can be catalysed by the addition of various substances. However, in the use of the known catalysts, it turned out that the activity developed was to low and that polymerization of the unsaturated compound occurred to a great degree. This is especially true when peroxides and heterogeneous catalysts such as noble metal and supported noble metal catalysts are employed. On the other hand, catalysts are known which possess a very high activity but which at the same time, in view of their high activity, also promote side reactions such as, for example, the disproportionation of trialkoxy silane used as the silane component. This above all is the case when hexachloroplatinic acid is used as the catalyst. Diverse non-noble metal containing catalysts have also been mentioned in the literature which, however, either react with the silanes used and therefore suffer a reduction in their activity or are difficult to prepare and are not very stable on storage.

DETAILED DESCRIPTION OF THE INVENTION INCLUDING PREFERRED EMBODIMENTS

The object of the present invention is to provide a catalyst for the addition reaction described above which does not have the disadvantages indicated.

According to the invention it was found that complex platinum compounds of the empirical formula $$PtX_2(RCOCR'COR'')_2$$

with the probable formula

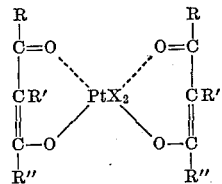

wherein X is a halogen atom, R is alkyl, R' is hydrogen or alkyl and R'' is alkyl or alkoxy, the alkyl and alkoxy preferably being lower alkyl and lower alkoxy, are catalysts of good activity and selectivity for the addition reaction concerned.

The catalysts therefore are marked by their high catalytic action coupled with a selectivity which was absent in the previously employed catalysts. This is especially indicated in that the organosilanes employed as starting components are not changed and the conversions proceed with practically stoichiometric yields. This also renders it possible that the reaction products can be used directly without the necessity of taking further purification measures.

The catalysts according to the invention are preferably employed in a homogeneous phase, therefore in an organic solvent. Acetone and aceto acetic ester, for example, are especially suited as such solvents. The catalyst concentration required is of the order of $10^{-3}$ to $10^{-8}$ mol of platinum per mol of silane and preferably about $10^{-5}$ mol Pt/mol silane.

In view of the high activity of the catalysts according to the invention, the addition reactions can already be carried out at room temperature or at moderately raised temperatures of, for example, about 30° C. At these low temperatures, the reaction velocity of the side and secondary reactions is so low that their influence on the desired reaction is so slight as to be inconsequential. The reactions normally can be carried out without use of superatmospheric pressures. However, gaseous reaction components are preferably reacted at elevated pressures such as, for example, the vapor pressure at the temperature employed.

The addition reactions can be advantageously carried out by introducing the silane to be added into a stirring vessel and adding the catalyst in the form and quantity described thereto, then heating the contents of the vessel to about 30° C. and then adding the unsaturated organic component portionwise while vigorously stirring the reaction mixture. The exothermic reaction which initiates immediately is controlled by controlling the rate at which the unsaturated organic compound is added and/or by occasional suitable cooling so that overheating is avoided. After all of the reaction components have been added it is advantageous to allow the reaction components to react further for a short period of time.

The addition product thus obtained can be used immediately for other reactions or can be used directly.

As already mentioned it is on principle possible to use all Si-compounds having at least one H bonded directly to Si of the general formula $$H_xSiR_{4-x}$$

R being f.i. halogenes, alkoxy-groups, alkyl-groups, cycloalkyl-groups, aryl-groups.

Preferably silicon hydrogene compounds with R=halogenes, alkoxy-groups and alkyl-groups can be used. The selectivity of the inventive catalyst system is primarily achieved when using alkoxysilanes as f.i. $HSi(OCH_3)_3$ or $HSi(OC_2H_5)_3$ and $HSiCl_3$.

As already mentioned, all substances may be used which have at least one non-aromatic C—C double- or triple-bond. The general formulae for these compounds could be (a) $CH_2=CH-R$          (b) 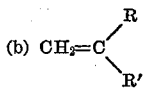

(c) $R-CH=CH-R'$        (d) 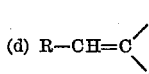

(e) $CH\equiv C-R$         (f) $R-C\equiv C-R'$

R and R' could be: alkyl-groups, aryl-groups, aminoalkyl-groups, halogenalkyl-groups, thioalkyl-groups, carbonacid-ester-groups, ether-groups, thioether-groups. The inventive catalyst system is of advantage especially with regard to such substances, the purification by distillation of which is very difficult owing to their considerable tendency to decomposition or polymerization after the reaction with the above mentioned silanes with respect to a too elevated boiling range.

The reaction of diallyl phthalate with $HSiCl_3$ and $$HSi(OCH_3)_3$$

and $HSi(OC_2H_5)_3$ respectively principally result in a diaduct if 2 mols of silane react with one mol of diallyl phthalate. In using less than two mols of silane per one mol of diallyl phthalate, however, monoadducts and mixtures of mono- and diadducts will be obtained.

Allyl methacrylate reacted with the above mentioned silanes under the aforementioned conditions, however, result exclusively in a monoadduct bonded at the allyl double bond.

An addition to the methacryl double bond of the methacrylic acid methyl ester could only be obtained in the autoclave with a slightly elevated pressure; the necessary thermal stress, however, leads to byreactions. The analogous diaddition with methacrylic acid allyl ester fails, however, owing to the high tendency of polymerization of the allyl methacrylate as well as of the γ-methacrylic oxypropyltrichloro-or-trialkoxy silane.

The following examples will serve to illustrate the process according to the invention:

EXAMPLE 1

1422 g. of trichlorosilane (10.5 mol) were introduced into a stirring flask and 1.0 ml. of a 0.01 mol solution of dichloroplatinum IV acetyl acetonate $$[PtCl_2(CH_3COCHCOCH_3)_2]$$

in acetone added thereto and the mixture heated while stirring so that it boils lightly under reflux. Thereafter 1262 g. of allyl methacrylate (10 mol) were added dropwise over a period of 2 hours without further supply of external heat. After such addition the reaction mixture was stirred for a further 2 hours at room temperature and then rinsed for 1 hour with a strong stream of nitrogen to remove the excess trichlorosilane. 2600 g. of reaction product were obtained, the gas chromatographic analysis of which revealed that it contained 96.2% of methacryloxypropyl trichlorosilane.

EXAMPLE 2

126 g. of allyl methacrylate (1 mol) were introduced into a stirring flask and 0.1 ml. of a 0.01 molar solution of

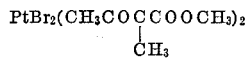

in acetone added thereto and the mixture preheated to 40° C. while stirring. Then 164 g. of triethoxysilane (1 mol) were added dropwise over a period of 1 hour without further supply of external heat, the mixture being cooled occasionally to avoid overheating. Thereafter the reaction mixture was stirred for a further 2 hours at 50° C. and cooled down under vacuum. The reaction product thus obtained contained 97.3% of methacryloxypropyl triethoxysilane.

EXAMPLE 3

246 g. of diallyl phthalate (1 mol) and 0.1 ml. of a 0.01 molar solution of $PtCl_2(CH_3COCHCOCH_3)_2$ in acetone were warmed up to 45° C. while stirring and 170.5 g. of triethoxysilane added dropwise thereto over a period of 90 minutes. Supply of external heat during such addition was not necessary. Occasionally the reaction mixture was cooled to avoid too lively a progress of the reaction. To complete the reaction the reaction mixture was then stirred for a further two hours. The reaction product which was obtained in a 97% yield could be used directly.

EXAMPLE 4

285 g. (=5 mols) of allyl amine are supplied to a stirring flask, 8 ml. of a 0.1 mol solution of $$PtCl_2(CH_3COCHCOOCH_3)_2$$

added in acetone and heated to boiling point. 611 g. (=5 mols) of trimethoxysilane, $HSi(OCH_3)_3$ are added within half an hour whilst stirring, afterwards the mixture is heated for a period of 48 hours at the reflux. The reaction product is then distilled in vacuo. The fraction obtained at a temperature of 76 to 86° C. at a pressure of 0.05 mm. Hg. contains 97.8% of γ-amino propyltrimethoxy silane. The yield is about 80% calculated on the equimolar amount of the reactants.

EXAMPLE 5

106 g. of diallylidene pentaerythritol (=½ mol) are dissolved in 200 ml. of hexane, 2 ml. of 0.1 mol solution of $PtCl_2(CH_3COCHCOCH_3)_2$ in acetone are added and heated to a temperature of about 55° C. 61.4 grams of trimethoxy silane (=½ mol) are dropped in the aforementioned solution without any further exothermic heat supply whilst stirring and brought to reaction for further half an hour. When the exothermic reaction has been finished the hexane is separated by distillation and the crystal slurry recrystallized from hexane. Yield: 150 grams of the adduct with a content of 7.7% of Si corresponding to a purity of about 92% and to a yield of about 83% of the theory.

EXAMPLE 6

1675 grams of $HSiCl_3$ (=12.35 mol) are supplied to a stirring flask, 12.5 ml. of a 0.1 mol $$PtCl_2(CH_3COCHCOCH_3)_2$$

solution in acetone are added and brought to the boiling point. 842.5 grams of isoprene (12.35 mol) are dropped into the boiling silicochloroform and subsequently the reaction mixture heated at the reflux for a period of 9 hours, whereby the temperature of the mixture increases to max. 95° C. After the reaction is finished the reaction mixture will be distilled as a fractionate whereby the following results are obtained: 1030 grams of a 1,4 monoadduct with traces of a 1,2 monoaduuct at a temperature of 41–42° C./6 mm. Hg according to a reaction yield of about 41% of the theory, and 835 grams of diadduct at a temperature of 98 to 100° C./4 mm. Hg according to a reaction yield of 20% of the theory.

EXAMPLE 7

135.44 grams of $HSiCl_3$ (=1 mol) are supplied to a flask, 1 ml. 0.1 mol of a $PtCl_2(CH_3COCHCOCH_3)_2$ solution in acetone added and brought to the boiling point. 74.5 grams of propargyl chloride (1 mol) are added at normal pressure whilst stirring and further heated for a period of 4 hours until the temperature of the mixture has reached 89° C. With the fractionated distillation of this reaction product 159.5 grams of a monoadduct are obtained in the boiling range of 30 to 40° C./1.5 mm. Hg. This corresponds to a reaction yield of 76% of the theory. The reaction products are suited as adhesive medium between glass, porcelain and other $SiO_2$ containing inorganic material and organic substances, preferably polymers on the one hand and for the selective modification of fillers on the other hand.

We claim:
1. In a process for the production of organic silicon by addition of a silicon compound containing at least one hydrogen atom bound directly to silicon and an organic compound containing at least one non-aromatic carbon to carbon multiple bond, the step of carrying out said ad- dition in the presence of an effective catalytic amount of a selective platinum compound of the formula $$PtX_2(RCOCR'COR'')_2$$

wherein X is halogen, R is alkyl, R' is seletced from the group consisting of hydrogen and alkyl and R" is selected from the group consisting of alkyl and alkoxy.

2. The process of claim 1 in which the alkyl and alkoxy of R, R' and R" are lower alkyl and lower alkoxy and the concentration of said catalyst is such as to pro- provide $10^{-3}$ to $10^{-8}$ mol Pt per mol of silane.

3. The process of claim 2 in which said silicon compound is selected from the group consisting of triloweralkoxy silanes and dichlorosilane.

4. The process of claim 2 in which said platinum compound is dichloroplatinum IV acetyl acetonate of the formula $PtCl_2CH_3—CO=CHCOCH_3)_2$.

References Cited

UNITED STATES PATENTS

| | | | |
|---|---|---|---|
| 2,970,150 | 1/1961 | Bailey | 260—448.2 XR |
| 3,159,601 | 12/1964 | Ashby | 260—448.2 XR |
| 3,159,662 | 12/1964 | Ashby | 260—448.2 |
| 3,220,972 | 11/1965 | Lamoreaux | 260—448.2 XR |
| 3,410,886 | 11/1968 | Joy | 260—448.2 |

TOBIAS E. LEVOW, Primary Examiner

J. P. PODGORSKI, Assistant Examiner

U.S. Cl. X.R.

260—448.8